(12) United States Patent
Morrison (10) Patent No.: US 7,665,707 B2
(45) Date of Patent: Feb. 23, 2010

(54) HANGER WITH PHOTO DISPLAY

(76) Inventor: David J. Morrison, P.O. Box 775, Pioche, NV (US) 89043

( * ) Notice: Subject to any disclaimer, the term of this patent is extended or adjusted under 35 U.S.C. 154(b) by 18 days.

(21) Appl. No.: 12/073,354

(22) Filed: Mar. 4, 2008

(65) Prior Publication Data

US 2008/0283715 A1    Nov. 20, 2008

Related U.S. Application Data (63) Continuation-in-part of application No. 11/798,896, filed on May 17, 2007, now abandoned.

(51) Int. Cl.
*F16M 13/00* (2006.01)
(52) U.S. Cl. .................. 248/549; 248/467; 40/702
(58) Field of Classification Search ............... 248/549, 248/467, 466; 223/85; 40/594, 700, 702, 40/725, 322, 644, 642.02, 649, 661, 661.09, 40/799
See application file for complete search history.

(56) References Cited

U.S. PATENT DOCUMENTS

| | | | |
|---|---|---|---|
| 2,409,814 A * | 10/1946 | Vargish | ................ 40/745 |
| 2,710,489 A | 6/1955 | Myers | |
| 3,885,768 A * | 5/1975 | Frye | ................ 248/549 |
| 3,978,601 A | 9/1976 | Catron | |
| 4,671,480 A * | 6/1987 | Frye | ................ 248/205.3 |
| 4,955,153 A * | 9/1990 | Albrecht et al. | ............ 40/661 |
| 5,129,614 A * | 7/1992 | Kohl | ................ 248/309.2 |
| D405,961 S | 2/1999 | Stangl et al. | |
| 6,052,933 A * | 4/2000 | Lytle | ................ 40/711 |
| 6,389,723 B1 * | 5/2002 | Rink, Jr. | ................ 40/642.02 |
| 6,789,773 B2 | 9/2004 | Holland | |
| 7,150,120 B1 * | 12/2006 | Naymik | ................ 40/643 |
| 2005/0268507 A1 | 12/2005 | Valiulis et al. | |

* cited by examiner

*Primary Examiner*—J. Allen Shriver, II
*Assistant Examiner*—Bradley H Duckworth
(74) *Attorney, Agent, or Firm*—Richard C. Litman (57) ABSTRACT

The hanger with photo display is a support hook(s) incorporating a display adjunct. The hook is fabricated from a flat sheet of material. The material is capable of a high degree of flexing without breaking. Double-sided tape is employed to mount the sheet on a flat, vertical surface such as a wall or door. The sheet is sized to neatly present a display item. The display item may take the form of a photograph, an advertisement, a message, or the like. The display item can be easily changed without causing the double-sided mounting tape to release. The hook is designed to support a load of pre-determined maximum weight. If the pre-determined weight is exceeded, the hook will bend (without breaking) to release the load.

2 Claims, 10 Drawing Sheets

HANGER WITH PHOTO DISPLAY

CROSS-REFERENCE TO RELATED APPLICATION

This application is a continuation-in-part of U.S. patent application Ser. No. 11/798,896, filed May 17, 2007 now abandoned.

BACKGROUND OF THE INVENTION

1. Field of the Invention

The present invention generally relates to supports. More specifically, the present invention is drawn to hook support structure incorporating a display adjunct therewith.

2. Description of the Related Art

The use of hooks for supporting objects, such as garments, hats, keys, umbrellas, etc., is commonplace. The hooks are conventionally mounted on walls or doors in the home or office. Unfortunately, conventional hooks are usually unsightly and add no "feng shui" to the surrounding area. Furthermore, conventional hooks are usually "permanently" mounted using a screw fastener or the like, which mars the wall or door. The art would certainly welcome a support hook that incorporates a decorative adjunct and that could easily be mounted or removed from a wall or doorway. Thus, a hanger with a photo display solving the aforementioned problems is desired.

SUMMARY OF THE INVENTION

The hanger with photo display has a support hook(s) incorporating a display adjunct. The hook is fabricated from a flat sheet of material. The material may be transparent and is capable of a high degree of flexing without breaking. Double-sided tape is employed to mount the sheet on a flat, vertical surface, such as a wall or door. The sheet is adapted to neatly present a display. The display may take the form of a photograph, an advertisement, a message, or the like. The display can be easily changed without causing the double-sided mounting tape to release. The hook is designed to support a load having a predetermined maximum weight. If the predetermined weight is exceeded, the hook will bend (without breaking) to release the load. This arrangement presents a serviceable support hook in conjunction with a pleasing decorative display. The sheet may also incorporate an array of hooks.

Accordingly, the invention presents a support hook(s) that can be easily and quickly mounted to almost any vertical surface. The support hook incorporates an adjunct that may be utilized to tastefully display photographs or other types of visual material. The invention provides for improved elements thereof in an arrangement for the purposes described that are inexpensive, dependable and fully effective in accomplishing its intended purposes.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
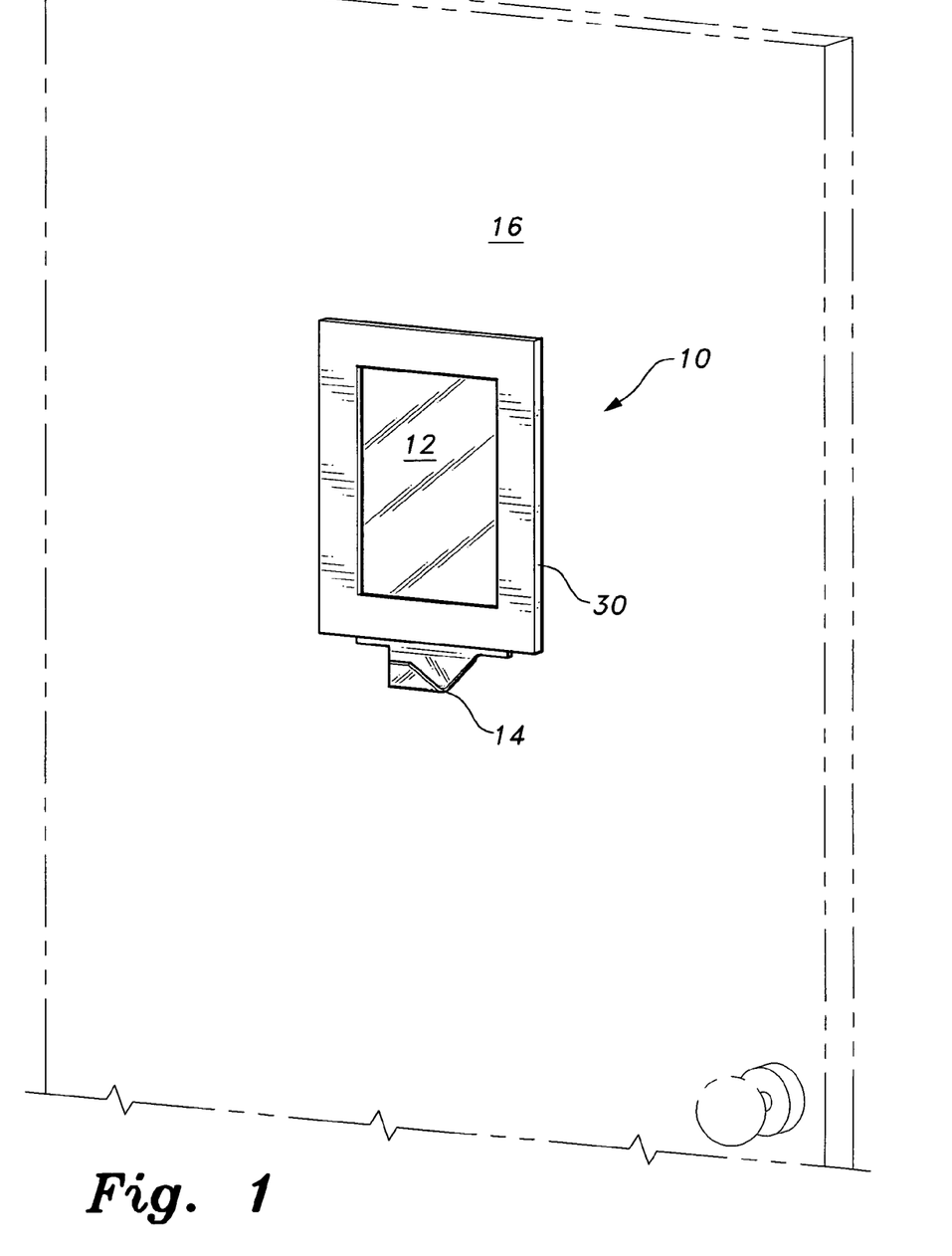
FIG. 1 is an environmental, perspective view of a hanger with a photo display according to the present invention.

Attention is first directed to FIG. 1, wherein the hanger with a photo display is generally indicated at 10. Hanger 10 comprises a sheet of plastic material 12 incorporating a support hook 14. Sheet 12 is mounted to a vertical surface 16, such as a wall or a door (as shown). A frame member 30 is removably mounted on sheet 12 in a manner that will be explained below.

Figure 2:
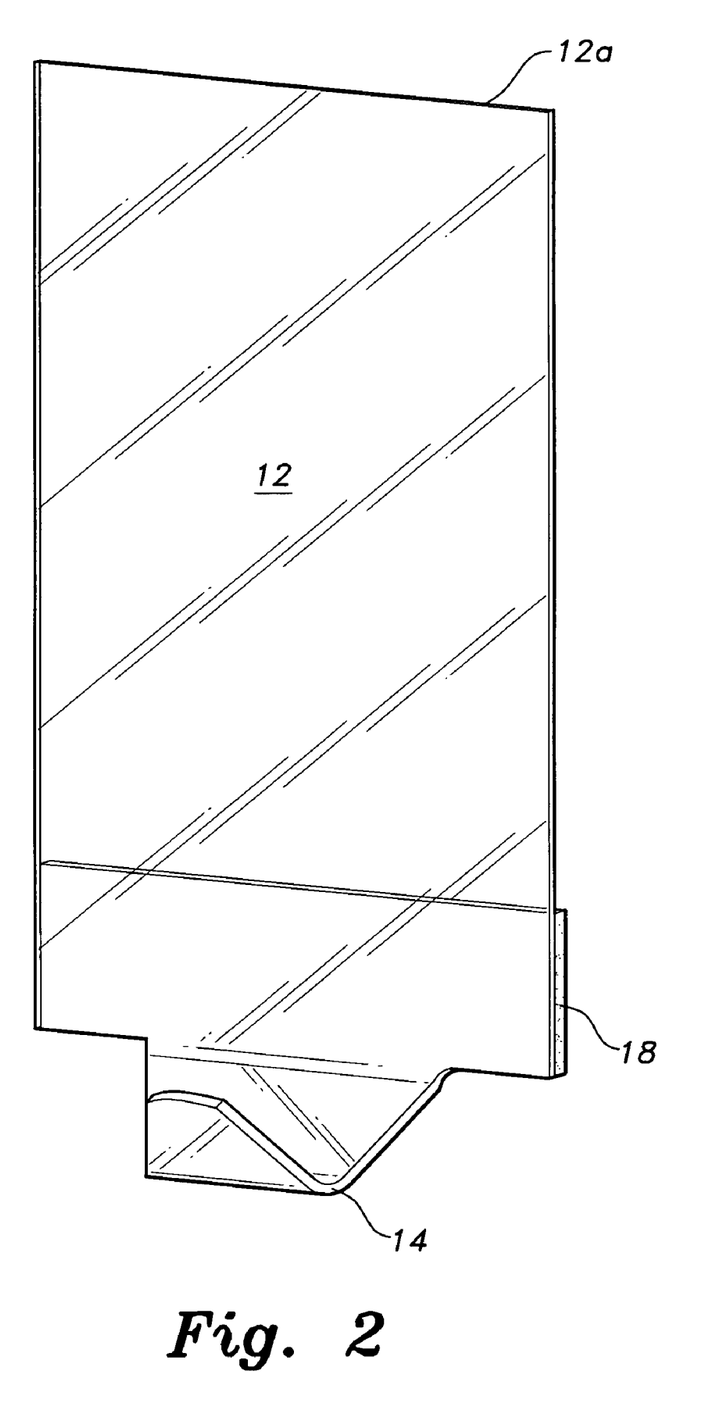
FIG. 2 is a perspective view of the transparent sheet of a hanger with a photo display according to the present invention.
Figure 3:
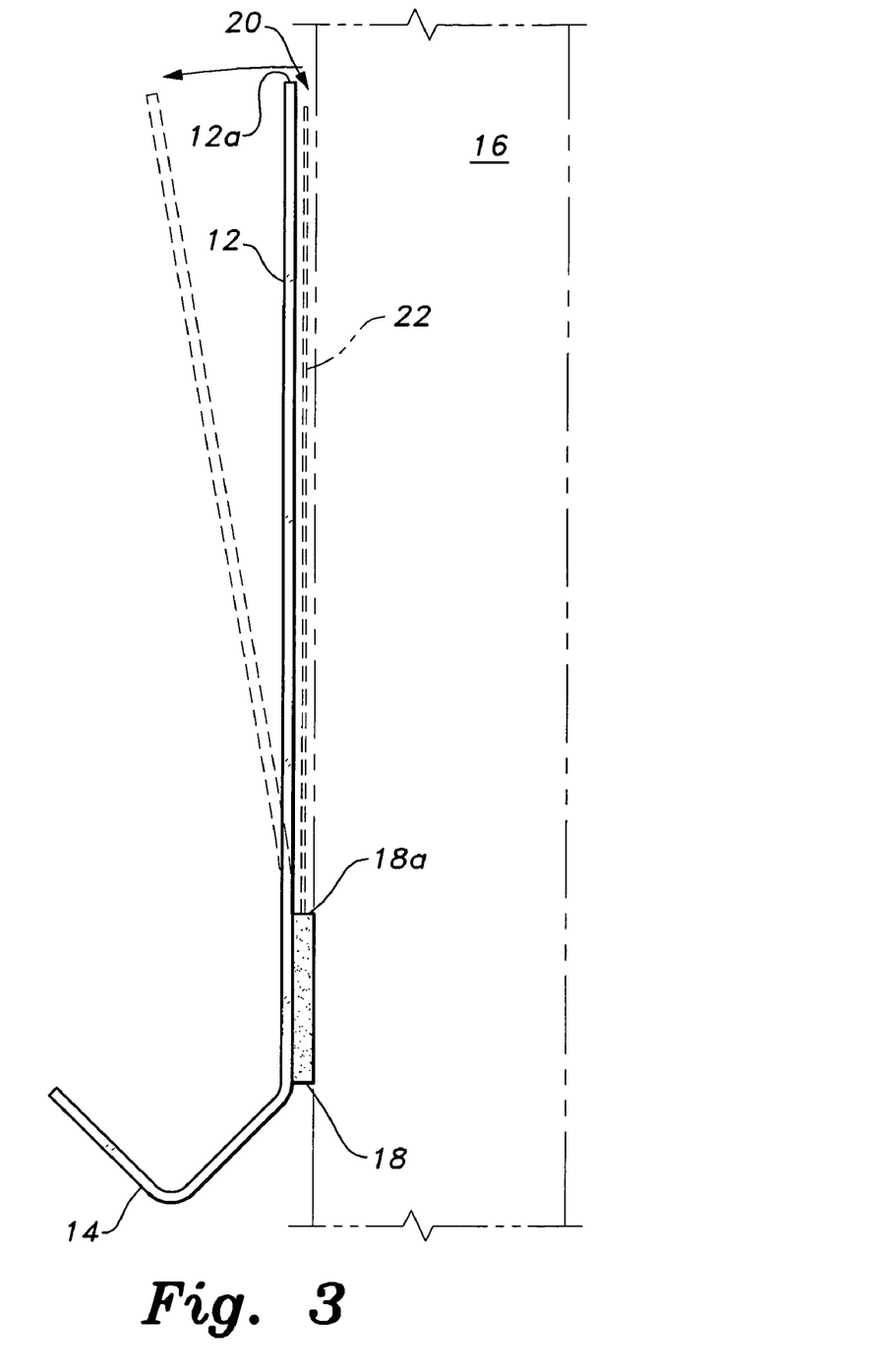
FIG. 3 is a side view of the transparent sheet of a hanger with a photo display according to the present invention.

As best seen in FIGS. 2 and 3, sheet 12 and hook 14 are fabricated from a single piece of transparent, plastic material. The plastic material has high degree of flexibility that will allow the hook to bend (note phantom lines) without breaking, but has sufficient memory or resilience that the material resumes the hook shape when the bending force is removed. Any transparent material exhibiting these qualities may be utilized to fabricate the sheet if such material is otherwise suitable (costs, availability, non-toxic, etc.)

A strip of double-sided adhesive 18 is employed to mount the rear surface of sheet 12 to vertical surface 16. Adhesive strip 18 is of sufficient size to maintain a bond between sheet 12 and surface 16 when a load of predetermined weight is disposed on hook 14. A small space 20 is formed between the rear surface of sheet 12 and vertical surface 16. Space 20 extends from the top edge 12a of sheet 12 to the top edge 18a of double sided adhesive strip 18. As contemplated, a selected display item 22 may be removably disposed in the space 20 in a manner to be viewed through the front surface of sheet 12. As indicated above, although the present invention is referred to as a hanger with photo display, the display item may take the form of a photograph, a memo or any type of visual material. The dimensions of the display item will be coextensive with the dimensions of sheet 12.

Figure 4:
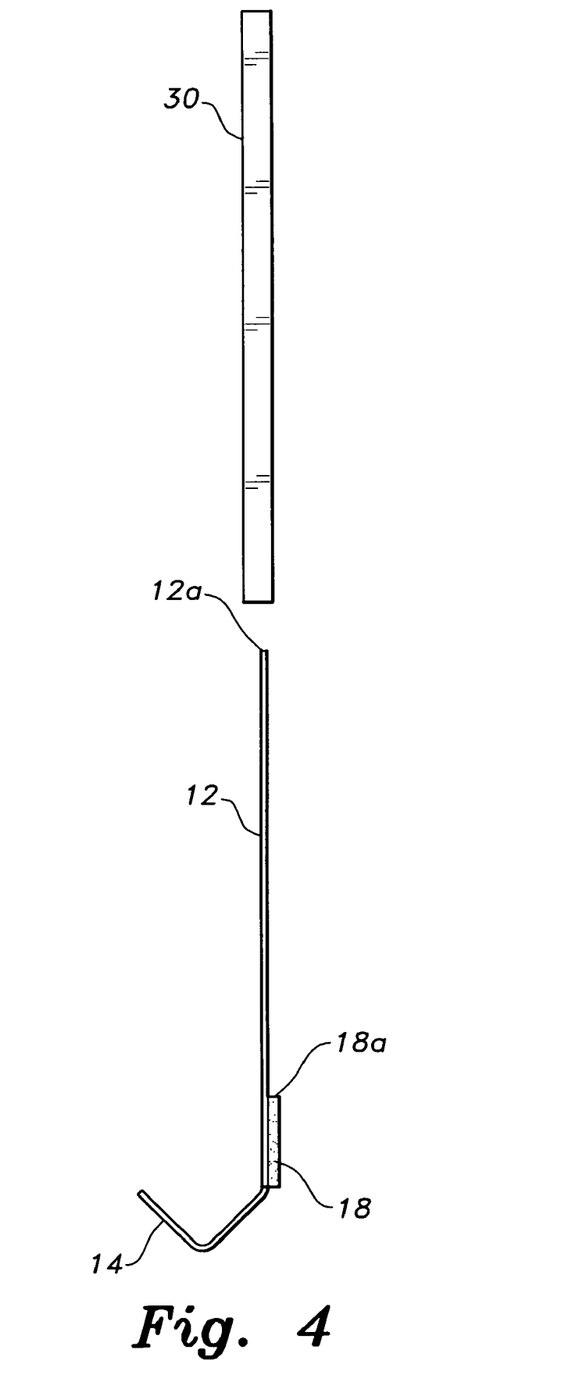
FIG. 4 is an exploded, side view of the transparent sheet and decorative frame of a hanger with a photo display according to the present invention.
Figure 5:
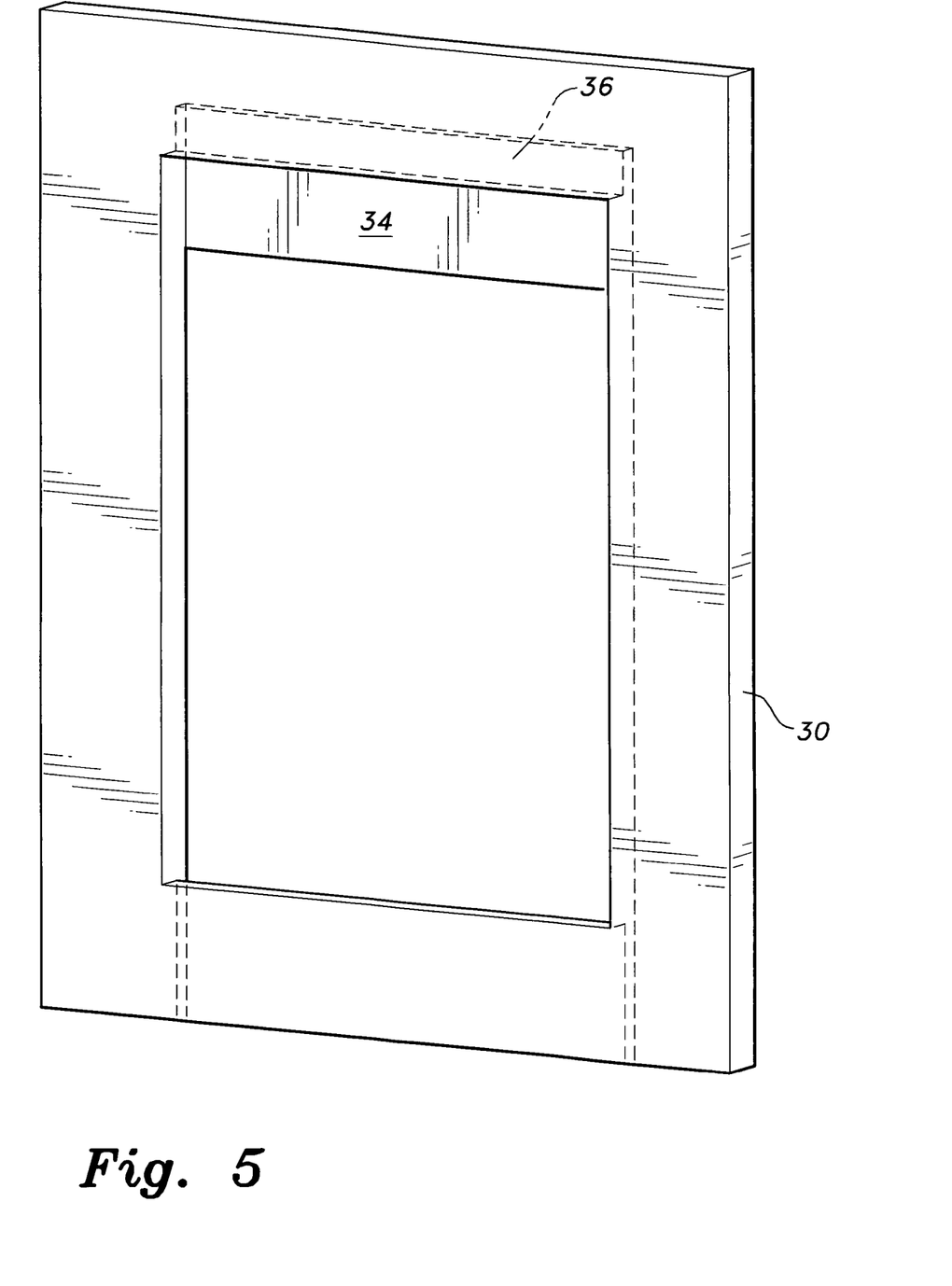
FIG. 5 is a perspective view of the decorative frame of a hanger with a photo display according to the present invention.
Figure 6:
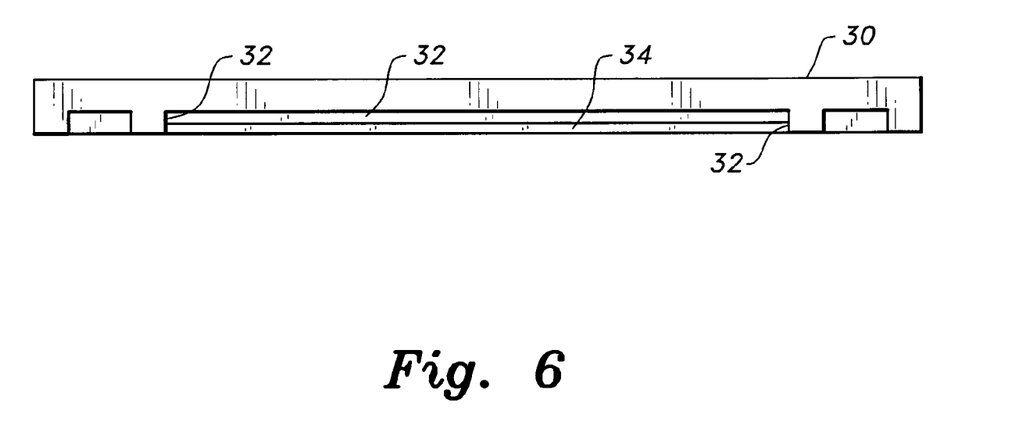
FIG. 6 is a bottom view of the decorative frame of a hanger with a photo display according to the present invention.

Attention is now directed to FIGS. 4-6, which illustrate the disposition of decorative frame 30 onto sheet 12. Frame 30 is configured to encapsulate the perimeter of sheet 12 while leaving hook 14 and the front surface of sheet 12 exposed. The side edges of sheet 12 are received within the side walls 32 of frame 30. Wall 34 is positioned across the rear of frame 30 to form a pocket 36 adapted to receive the top edge 12a of sheet 12 therein. This arrangement allows frame 30 to be easily mounted and removed if it is desired to change a display item. Although illustrated as rectangular, it is obvious that the sheet 12 and frame 30 could be fabricated in other configurations and of various sizes, if desired.

Figure 7:
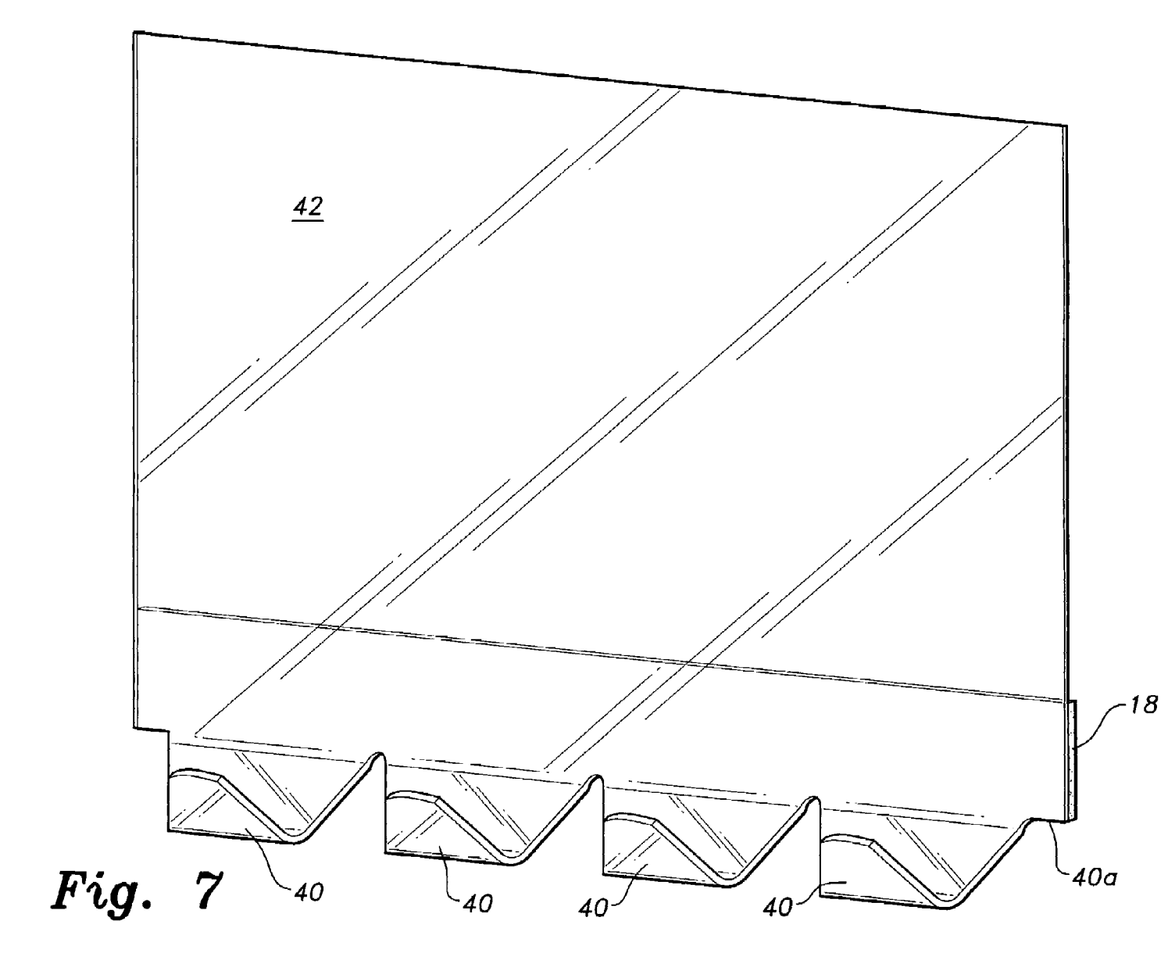
FIG. 7 is a perspective view of a second embodiment of the transparent sheet of a hanger with a photo display according to the present invention.

FIG. 7 shows a second embodiment of the invention wherein plural hooks 40 are disposed along a bottom edge 40a of transparent sheet 42. A decorative frame (not shown) is configured to be disposed on sheet 42 in the same manner as described above relative to sheet 12. This embodiment is especially useful for hanging an array of keys thereon.

Figure 8:
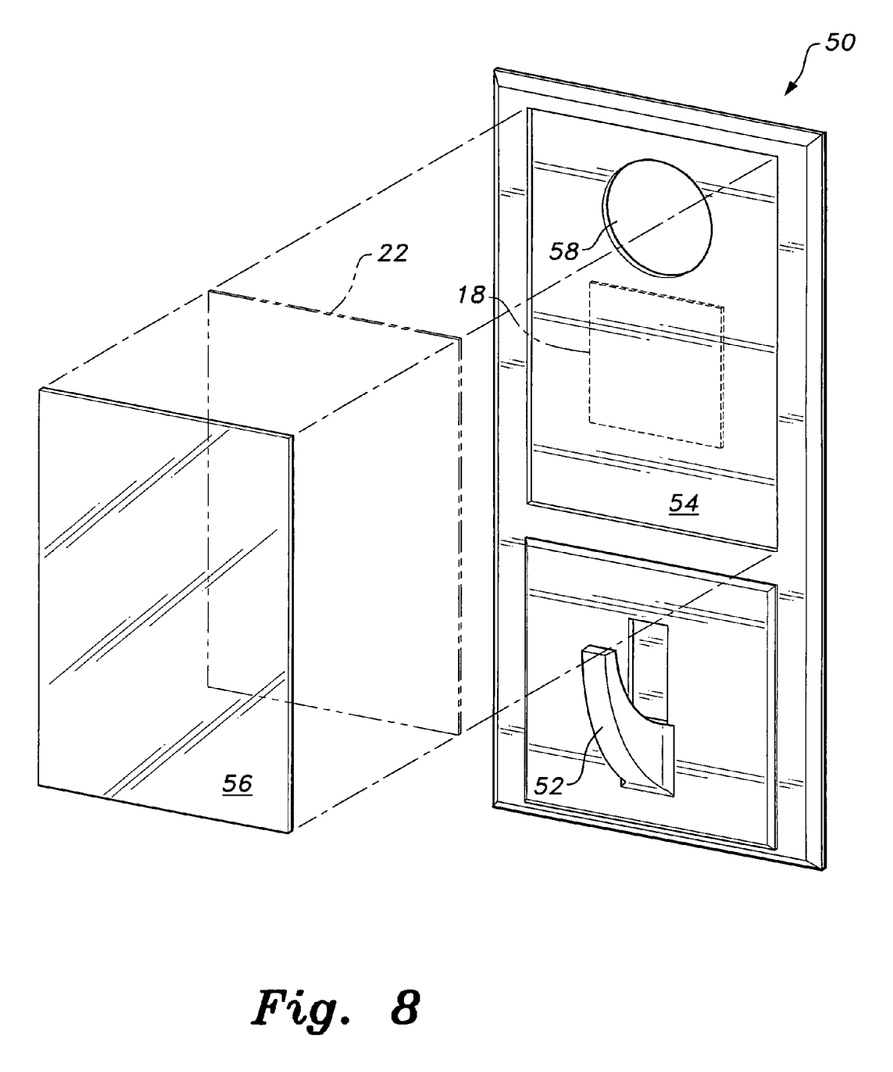
FIG. 8 is an exploded perspective view of a third embodiment of a hanger with a photo display according to the present invention.
Figure 9:
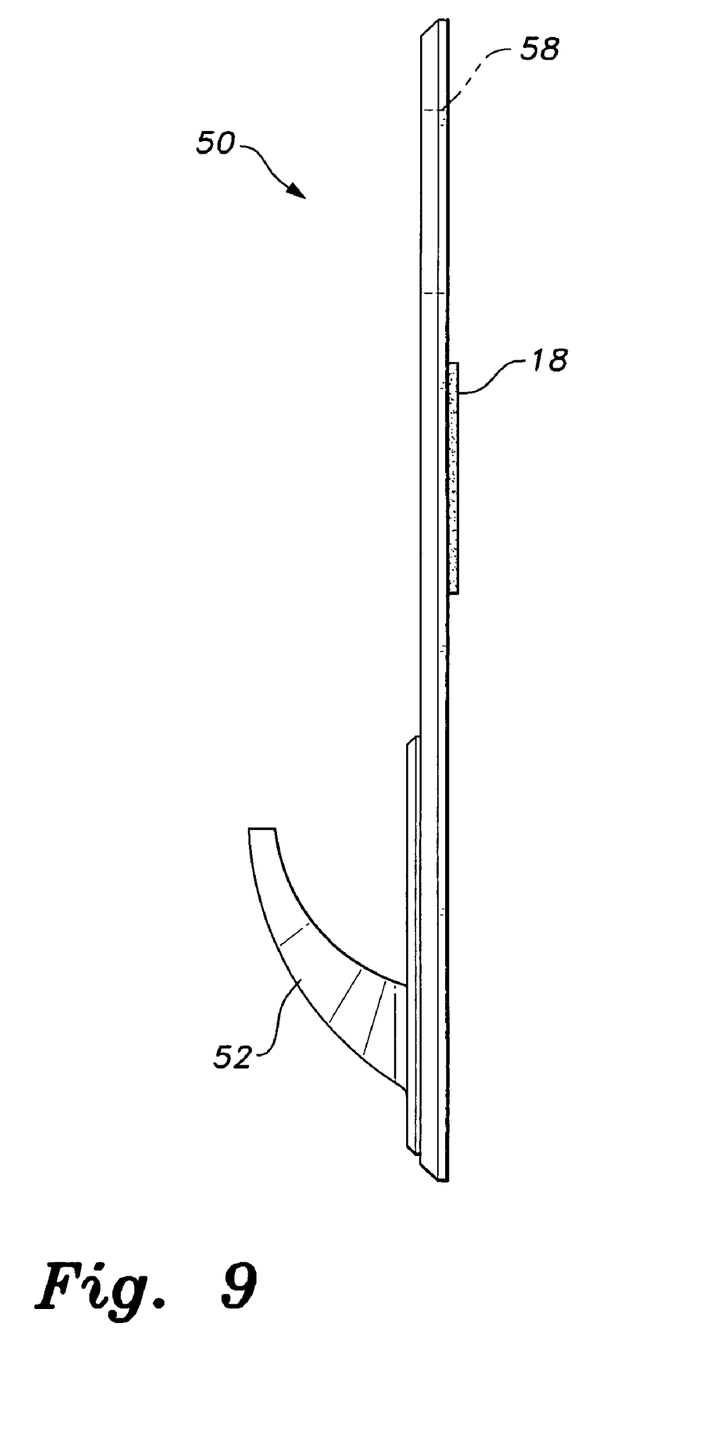
FIG. 9 is a side view of the hanger of FIG. 8.

FIGS. 8 and 9 are illustrative of a third embodiment of the invention that incorporates a single, unitary sheet 50 provided with a hook 52 at the lower end thereof. The front surface of sheet 50 is designed with a cavity 54 therein. Cavity 54 is adapted to receive a display item 22, the display item 22 being nested within the cavity 54. A transparent window 56 is removably press-fitted into cavity 54 to retain the display item 22 in the cavity 54. Double-sided adhesive strips 18 are employed on the rear surface of sheet 50 to removably mount the sheet on a vertical surface. An opening 58 is formed through sheet 50 to facilitate the removal of window 56 when it is desired to change the display 22. Although illustrated as rectangular, it is obvious that sheet 50 can be fabricated in other configurations, if desired. Sheet 50 can be transparent, translucent or opaque.

Figure 10:
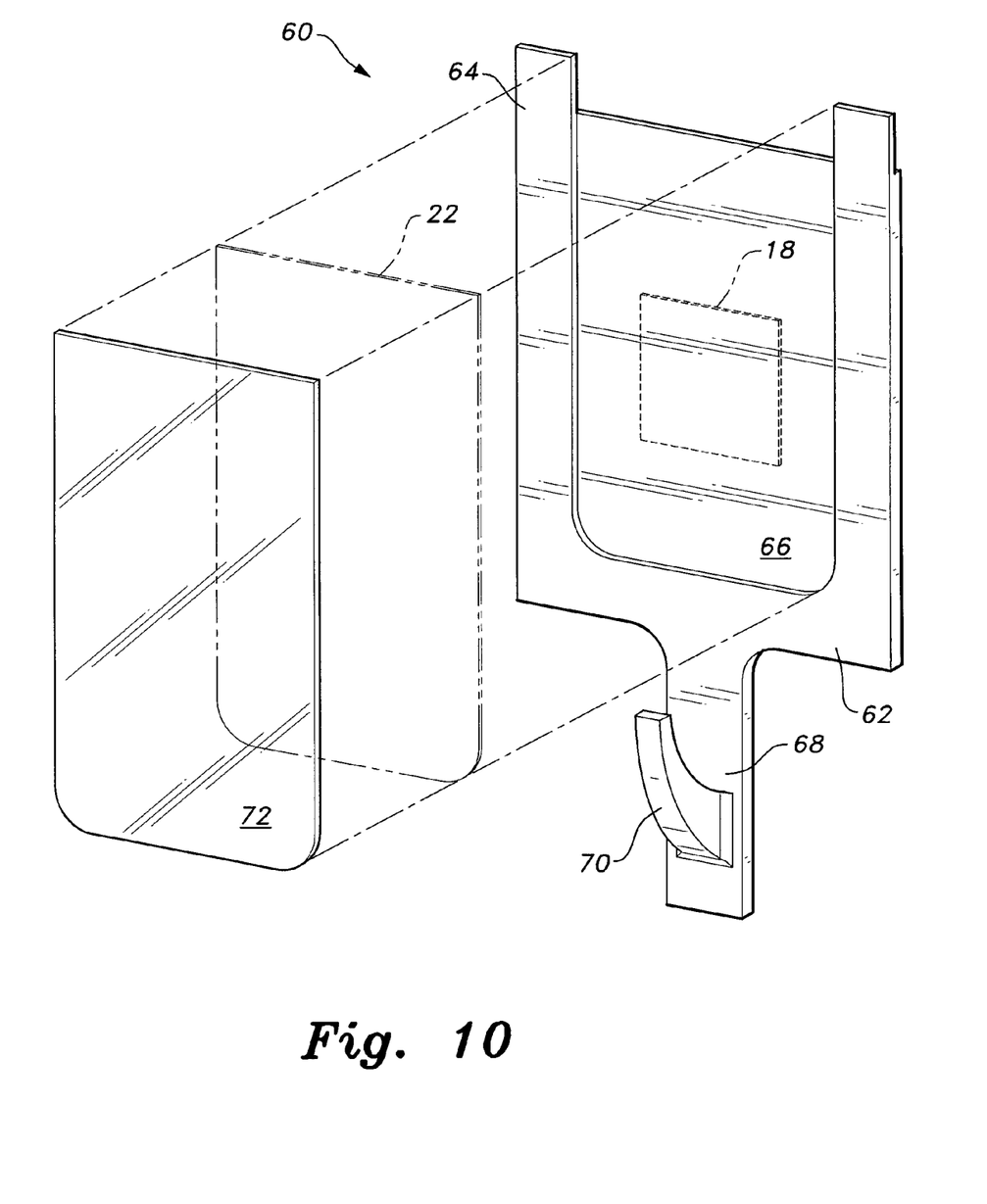
FIG. 10 is an exploded, perspective view of a fourth embodiment of a hanger with a photo display according to the present invention.

As best seen in FIG. 10, a fourth embodiment of the invention is provided with a unitary sheet 60 having a base 62. Respective sides 64 extend perpendicularly upward from the base 62, forming a fork defining a cavity 66. A single leg 68 extends medially downward from base 62. A hook 70 is positioned on the front surface of leg 68. As in the embodiment described immediately above, a display item 22 is sized to nest within cavity 66 and a transparent window 72 is press-fitted into cavity 66 to retain the display item therein. Sheet 60 can be transparent, translucent or opaque.

As indicated above, the hooks are designed to support a load having predetermined maximum weight. If the predetermined weight is exceeded, the hooks will bend (without breaking) to release the load. The flexibility and the memory or resilience of the material will allow the hook to return to its original position.

It is to be understood that the present invention is not limited to the embodiments described above, but encompasses any and all embodiments within the scope of the following claims.

I claim:

1. A hanger with display, consisting essentially of:
 a thin, transparent sheet having a front surface, a rear surface, a top edge, a bottom edge, two side edges, said sheet defining a display area in a first position;
 at least one hook attached to the sheet below said bottom edge, wherein said sheet and said hook are fabricated in one piece from a plastic material having a high degree of flexibility; and
 a double-sided adhesive strip extending across and adhesively attached to the rear surface of the sheet solely at a location adjacent the juncture of said hook and said bottom edge,
 whereby the sheet is capable of forwardly flexing to a second position so that an item to be displayed may be inserted behind the sheet and held there upon return of the sheet to its first position.

2. The hanger according to claim 1, wherein said hook has sufficient strength and rigidity to support a load up to a predetermined weight, said hook having sufficient flexibility and resilience to bend without breaking to release a load exceeding the predetermined weight.

* * * * *